2,991,310
PREPARATION OF N,N-DIETHYLTOLUAMIDES
William L. Phalen, Jr., St. Simons Island, Ga., assignor to Hercules Powder Company, Wilmington, Del., a corporation of Delaware
No Drawing. Filed Dec. 10, 1958, Ser. No. 779,292
2 Claims. (Cl. 260—558)

This invention relates to a process for the preparation of N,N-diethyltoluamides and more particularly to the preparation of N,N-diethyl-m-toluamide.

It has recently been established that N,N-diethyl-m-toluamide is a very effective insect repellent. The compound itself has been known for a number of years, and its preparation by reaction of diethylamine with the acid chloride of m-toluic acid is recorded in the literature. It has recently been found that N,N-diethyltoluamides may be produced in high yield and with high conversion, and with minimum formation of color and odor bodies and other by-products, through utilization of a continuous vapor phase process involving a selective catalyst which may be either silica gel or alumina. This process is more fully described and claimed in the copending application of Romeo B. Wagner, Serial No. 705,797, filed December 30, 1957, now Patent No. 2,932,665. The process involves continuously introducing diethylamine and toluic acid, in a molar ratio of amine to acid which is between about 2:1 and about 6:1, into a reaction zone containing one of the aforementioned catalysts, and passing the amine and acid in intimate contact with each other over the catalyst at a rate which corresponds to a contact time of up to about 2 minutes, the temperature being in the range of 250° to 350° C. The amide is continuously removed in the vapor state from the reaction zone and is condensed.

The present invention represents an improvement in the above process of preparing N,N-diethyltoluamides. The improvement comprises passing the toluic acid feed material for the amidation process through two consecutive pretreatment zones, and vaporizing said feed material in one of said zones and effecting separation between said feed material and any tar contaminants in another of said zones.

The process of this invention is more particularly set forth in the following specific examples. All parts and percentages in this specification and claims are by weight unless otherwise noted. The following terms are defined for a better understanding of the examples:

(1) Percent reacted equals the quantity of reactant used up chemically divided by the quantity of reactant charged and multiplied by 100.

(2) Percent reaction conversion equals the quantity of product formed divided by the theoretical quantity of product expected from the quantity of product expected from the quantity of reactant charged multiplied by 100.

(3) Percent process conversion equals the quantity of product recovered divided by the theoretical quantity of the product expected from the quantity of reactant charged multiplied by 100.

(4) Percent reaction yield equals the quantity of product formed divided by the theoretical quantity of product expected from the quantity of reactant used up chemically multiplied by 100.

(5) Percent process yield equals the quantity of product recovered divided by the theoretical quantity of product expected from the quantity of reactant used up chemically multiplied by 100.

(6) Contact time equals the millimoles of perfect gas which occupies the empty reactor volume divided by the millimoles/minute of reactants fed to the reactor. It also may be defined as the time the reactants reside in the zone of the catalyst bed, assuming the catalyst occupies no volume, and may be represented by the equation $$C_T = \frac{VTP}{1.315 MO}$$

where $C_T$=contact time in minutes, $V$=volume of catalytic zone in cubic feet, $T$=time in minutes, $P$=pressure in atmospheres, $M$=pound-moles of reactants, and $O$=temperature in degrees Kelvin.

EXAMPLE 1

The toluic acid feed material utilized in this example was a crude toluic acid formed by the saponification of methyl toluate. The latter compound had been formed by esterification of the toluic acid produced by oxidation of a mixture of xylene isomers. The methyl toluate contained materials which included dimethylterphthalate and dimethylisophthalate and, upon saponification, there was formed in addition to toluic acid some terphthalic and isophthalic acids. Also in the crude acid were other unknown and unidentified impurities.

The crude toluic acid was consecutively passed through a vaporizer and a separator. The vaporizer was essentially a tubular steel enclosure of six-inch internal diameter, in which was positioned a coil of 0.25-inch diameter stainless steel tubing. The ends of the coil were connected to openings in opposite ends of the steel enclosure. The coil was heated by means of Dowtherm vapors condensing on the external surfaces of the stainless steel tubing from which the coil was fabricated. The toluic acid in molten form was fed to the top of the vaporizer, passed through the heated coil, and removed from the bottom of the vaporizer as vaporized toluic acid and tar. Attached to the vaporizer was a separator which was essentially a stainless steel container at the top of which was a fitted opening connecting to a condenser for removal of vaporized toluic acid. The bottom of the separator was fitted with a valve to permit periodic removal of separated tarry contaminants.

Through the above-described system there was passed 288.5 parts of the crude toluic acid with the vaporizer operating at a temperature of 324° C. and the separator at a temperature of 282° C. From this amount of crude acid, there was removed 6.25 parts of tars. Similarly, 287.5 parts of crude toluic acid was processed using a vaporizing temperature of 312° C. and a separator temperature of 279° C. There was recovered 5.33 parts of tars. While operating the vaporizer at 314° C. and the separator at 282° C., 214.5 parts of crude acid was processed to recover 8.98 parts of tarry material.

EXAMPLE 2

The toluic acid material processed under this example was in the form of diethylammonium toluate wherein the mole ratio of diethylamine to toluic acid was approximately 2:1. A total of 1323 parts of diethylammonium toluate was passed through the vaporizer and separator described in Example 1 and there was recovered 18.45 parts of tar. During this operation the temperature in the vaporizer was varied between 292° C. and 306° C. and the temperature in the separator similarly varied between 264° C. and 278° C.

EXAMPLE 3

The crude toluic acid utilized in this example was similar to that of Example 1 and a total of 2,000 parts was processed. In distinction from Example 1, the separator was operated for continuous removal of the tars. This was accomplished by providing the separator with a bottom leg-type fitting which was heated by means of steam passed through coils surrounding the leg. Also in the present example, diethylamine was added to the crude toluic acid just prior to entry into the vaporizer, thus forming diethylammonium toluate, and this product was passed downwardly through the vaporizer and then into the separator.

The crude acid was fed at a rate corresponding to about 8 pounds per hour through a rotameter and then through a steam-jacketed line into the vaporizer. Diethylamine in an amount corresponding to 6 pounds per hour was pumped into the line carrying the crude acid to the vaporizer. The material exiting from the vaporizer passed into the separator where the vapors passed out overhead to a condenser sysem while tarry matter was removed as bottoms material through the leg fitting. A small additional amount of diethylamine, corresponding to about 3 pounds per hour, was pumped into the condenser system in order to reduce the viscosity of the diethylammonium toluate product. This product, which represented an approximate 2:1 mole ratio of diethylamine to toluic acid, was collected as it came from the condenser. The average temperature in the vaporizer was 285° C. and the average temperature in the separator was 265° C.

To the purified toluic acid, in the form of its diethylammonium salt, was added sufficient diethylamine to furnish a solution of diethylammonium toluate in diethylamine with the mole ratio of diethylamine to toluic acid being 5:1. This material then was used as feed in the continuous vapor phase process for producing N,N-diethyltoluamide. The amidation reaction was carried out in a stainless steel reactor 24 inches in length and having an internal diameter of 6 inches. Its full length was packed with silica gel, mesh size 10. The reactor was fitted with the necessary thermocouples and heating means and was designed for downflow and for feeding the diethylamine and toluic acid separately or combined. The feed material was fed to the reactor from a feed drum through a rotameter and a preheater. The reaction effluent after passing through a condenser was collected in stainless steel product receiving tanks.

The procedure utilized was to pass hot feed material through the reactor during the time needed to bring it up to a temperature of 285° C. When this temperature level was reached, the measured run was started. The diethylammonium toluate was fed to the reactor at such a rate so as to provide a contact time of 0.35 minute. There was a small amount of water in the feed material to the extent it provided a molar ratio of water to toluic acid which was 0.19.

During the amidation reaction the condenser was operated under partial condensation to permit removal of most of the diethylamine as vapor from the rest of the reaction product mixture and to condense the latter. Analysis of the condensate showed about 93% of the diethylammonium toluate had reacted, and on a diethylammonium toluate basis, there had been 88% process conversion, 90% reaction conversion, 94% process yield and 97% reaction yield.

Upon completion of the amidation reaction the reactor was opened and it was found that the catalyst was essentially clean. There was only a small amount of tar found deposited in the preheater. However, by comparison to an amidation reaction carried out without the described pretreatment, the present process was eminently satisfactory. In the absence of pretreatment, the preheater and the catalyst bed of the reactor are heavily loaded with tarry materials after comparatively short periods of use.

The toluic acid used in the examples was a mixture of approximately 95% of the meta-isomer and 5% of the para-isomer, and it is desirable from the standpoint of insect repellency of the amide product to have as high a concentration of the meta-isomer as possible. Preferred mixtures are those wherein the meta to para ratio is above 80:20, more desirably above 85:15. Even more effective is the product obtained from the mixture of toluic acids utilized in the examples. However, other mixtures of the isomeric toluic acids also may be used in the process of this invention, for example, ortho-meta, ortho-para and ortho-meta-para, and the relative amounts of the isomers may be widely varied. Furthermore, any one particular toluic acid isomer may be utilized.

The diethylamine used in the process is desirably 100% secondary amine and substantially anhydrous. Small amounts of primary and tertiary amines may be permitted, but they as well as any products resulting therefrom should be removed from the final product. A highly desirable way to introduce the amine and toluic acid to the reactor is in the form of the salt of the two materials, namely, diethylammonium toluate. The salt is conveniently formed by adding the toluic acid to the required amount of diethylamine, and by having an excess of amine present there is formed a solution of the salt in the amine, thus providing a feed material which inhibits corrosion of materials of construction which would otherwise be unsuitable.

The improvement resulting in the process of this invention is based on the discovery that most of the commercially available toluic acid feed materials contain contaminants and impurities which cause difficulty in the amidation process due to the fact they are in the form of or result in formation of tars. Tars are undesirable because they plug the catalyst bed and/or the reactor, and foul the catalyst itself, rendering it inactive. Even when the amidation process is operated on high purity toluic acid and recycle of unreacted toluic acid is utilized, it is found that tar formation takes place. Thus, it is absolutely essential to provide the amidation reactor at all times with a tar-free toluic acid feed material.

The vaporization pretreatment zone used in accordance with this invention is operated at a temperature of between about 270° C. and about 330° C. and preferably between about 280° C. and about 290° C. The minimum temperature of about 270° C. is dictated by the need for effecting complete vaporization, whereas the maximum temperature of about 330° C. is necessitated by the fact that substantially higher temperatures will cause deposition of tars on the vaporizer heat exchange surfaces. The optimum operating temperature for the vaporizer has been found to be about 285° C. It is important in connection with the vaporization zone to provide for downward flow of the crude toluic acid or its diethylammonium salt. Otherwise, the vaporizer will have a tendency to clog up and act both as vaporizer and separator but inefficiently in either respect.

With respect to the pretreatment zone involving the separator, it has been found that the temperature of operation is quite critical and that the range should be between 260° C. and 285° C. A preferable range is 260° to 275° C. and the optimum temperature is 265° C. At temperatures above 285° C. there will not be sufficient toluic acid and/or diethylammonium toluate in the tarry bottoms to provide for free flow from the separator, and at temperatures below 260° C. an undue amount of toluic acid and/or diethylammonium toluate is lost from the separator in the form of the tarry bottoms. Thus, it is absolutely necessary that the temperature in this particular pretreatment zone be carefully controlled. It also is preferred to operate the separator for continuous removal of the tars since, otherwise, they tend to plug up the equipment. It has been found that the tars upon continued exposure to temperatures above 200° C. tend to form a thermosetting-type of resin.

Although, as shown in Example 1, the toluic acid feed material may be in the form of the crude acid per se, it also may be in the form of the diethylammonium salt of toluic acid, as illustrated by Examples 2 and 3. Furthermore, mixtures of toluic acid and the diethylammonium salt may be utilized. Also, any of these feed materials may comprise, as the case may be, the unreacted acid or diethylammonium salt recovered from the condensed crude amide and recycled to the amidation process. For example, where the condenser for the effluent from the amidation reactor is operated to provide total condensation, the unreacted diethylamine may be removed from the condensed effluent by direct distillation followed by benzene sparging, the latter treament effecting removal of that amount of diethylamine which existed in the reaction product as diethylammonium toluate. Unreacted toluic acid then may be removed by caustic extraction and the free acid recovered by acidification. This recovered acid then may be recycled for use alone as feed material, or in conjunction with other toluic acid or diethylammonium toluate.

Similarly, the condenser for the effluent from the amidation reactor may be operated under partial condensation to permit removal of unreacted diethylamine as vapor from the rest of the reaction product mixture and to condense the latter. The condensed mixture then will contain the rest of the diethylamine and all of the toluic acid in the form of the salt, diethylammonium toluate. This salt may be decomposed, as already described, by benzene sparging and the individual components recovered. Treatment with an acid, such as sulfuric acid, or an alkali, such as sodium hydroxide, also will effect decomposition of the salt, and the amine and acid components thereof recovered separately. However, it is preferred to extract the salt from the rest of the reaction product mixture with water. After removal of water from the resulting solution, the diethylammonium toluate which is recovered may be recycled as feed material in the improvement of this invention. It may be so used alone, or along with additional salt or in conjunction with toluic acid.

The processing of the salt, as shown in Examples 2 and 3, is advantageous in that it leads to a final product which represents a most satisfactory feed material to the amidation reactor. Usually, when it is the diethylammonium salt which is processed, there is an insufficient amount of diethylamine present to give a final mole ratio of diethylamine to toluic acid which is preferred for the amidation reaction. As a consequence, additional diethylamine may be added for this purpose to the salt recovered from the condensation of the overhead effluent from the separator. Furthermore, as shown in Example 3, it may be desirable to add some diethylamine to the condenser for the effluent to provide improved workability.

The improvement of this invention is a necessary adjunct to the described continuous, vapor-phase amidation reaction, but the improvement itself may be operated either intermittently or continuously. Intermittently operated, it will provide a reserve of purified toluic acid feed material which may be drawn upon for use in the amidation reaction. However, it is preferred to carry out the improvement continuously in conjunction with continuous amidation. Thus, a desirable embodiment of the overall process of this invention is that wherein all of the diethylamine and toluic acid needed for the amidation reaction are continuously vaporized and separated from tar contaminants in the pretreatment zones, and the purified feed continuously passed into the amidation reactor. The tars which are collected in the separator may be either continuously or intermittently removed therefrom, the preferred procedure being as previously indicated, namely, continuous removal.

What I claim and desire to protect by Letters Patent is:

1. In the continuous, vapor phase process for the preparation of N,N-diethyltoluamide by continuously passing diethylamine and toluic acid in a mole ratio of amine to acid between about 2:1 and about 6:1 over a catalyst selected from the group consisting of silica gel and alumina at a rate corresponding to a contact time of up to about two minutes at a temperature in the range of 250° C. to 350° C. and separating the amide produced thereby, the improvement which comprises vaporizing a mixture of all of said toluic acid and at least part of the diethylamine at the reaction temperature in the absence of a catalyst and separating tars formed in said vaporization prior to passing said toluic acid and the rest of said amine over the amidation catalyst.

2. The process of claim 1 wherein the toluic acid is m-toluic acid.

References Cited in the file of this patent

UNITED STATES PATENTS

| | | |
|---|---|---|
| 2,786,020 | Berriman et al. | Mar. 19, 1957 |
| 2,788,367 | Bills et al. | Apr. 9, 1957 |